April 5, 1932. D. HANLON 1,852,410
CAR DOOR
Filed Nov. 19, 1929 3 Sheets-Sheet 2
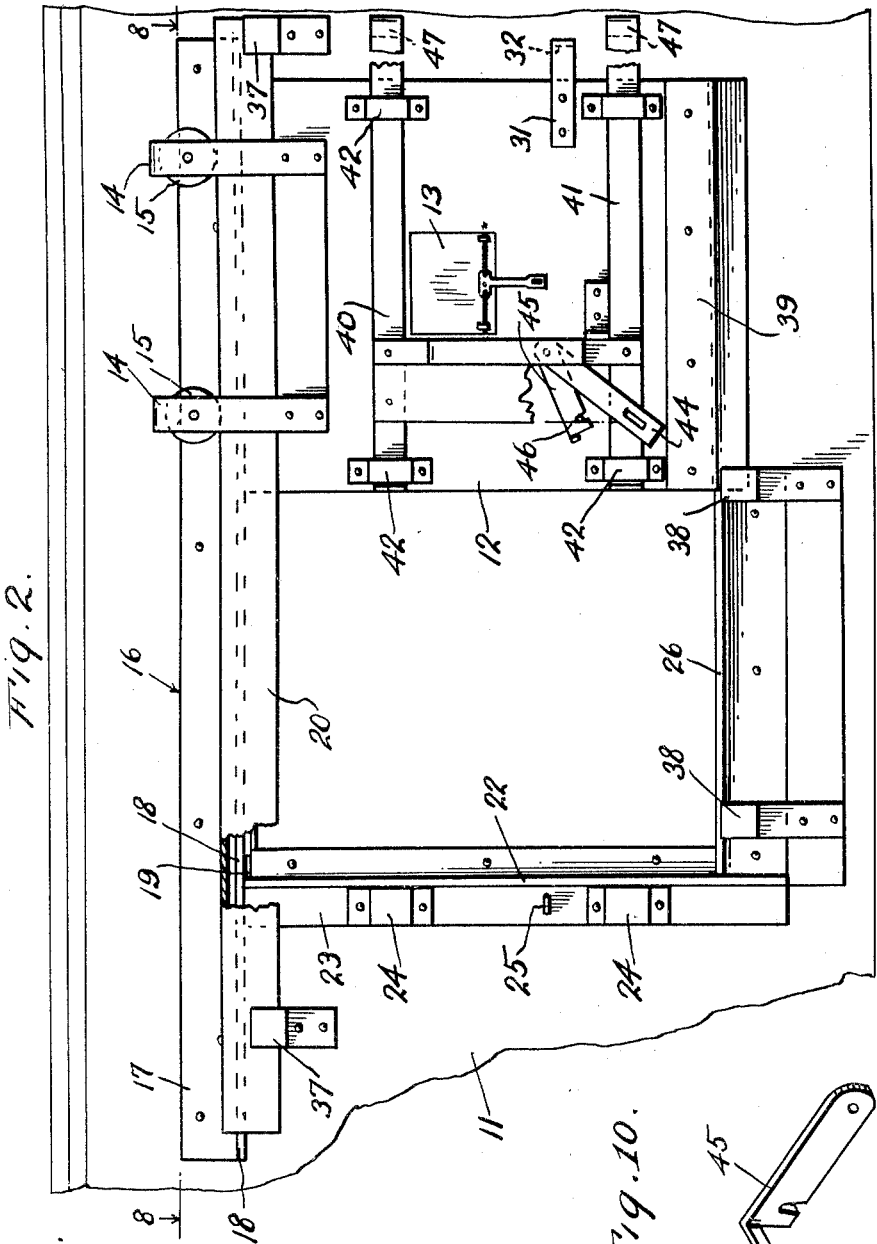
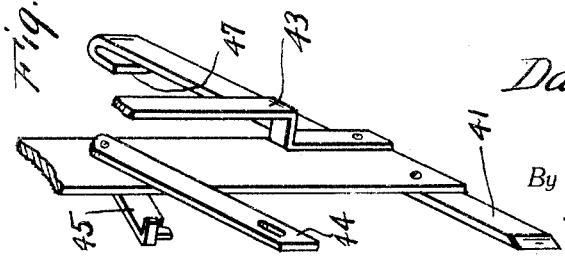
Inventor
Daniel Hanlon
By Clarence A. O'Brien
Attorney

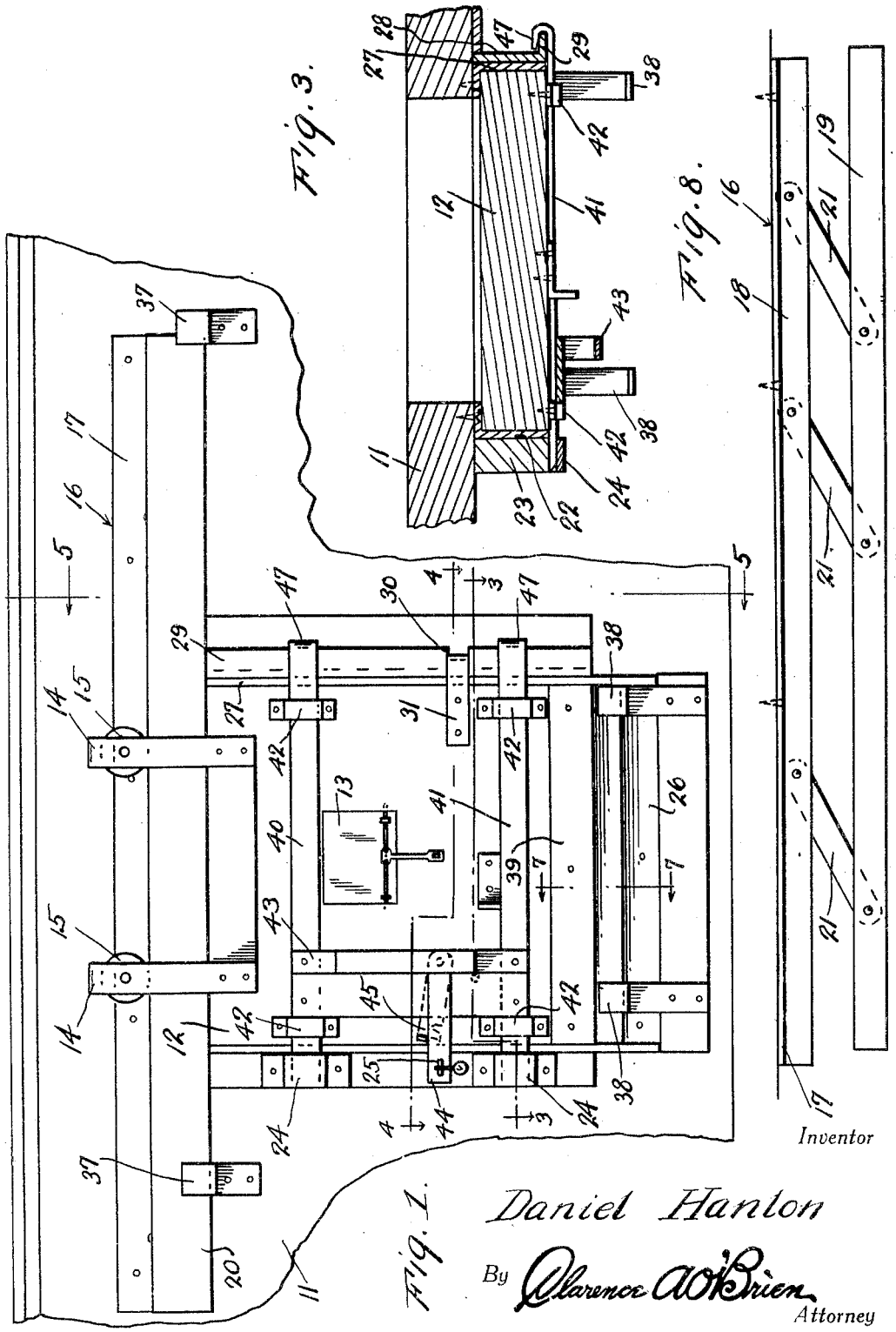

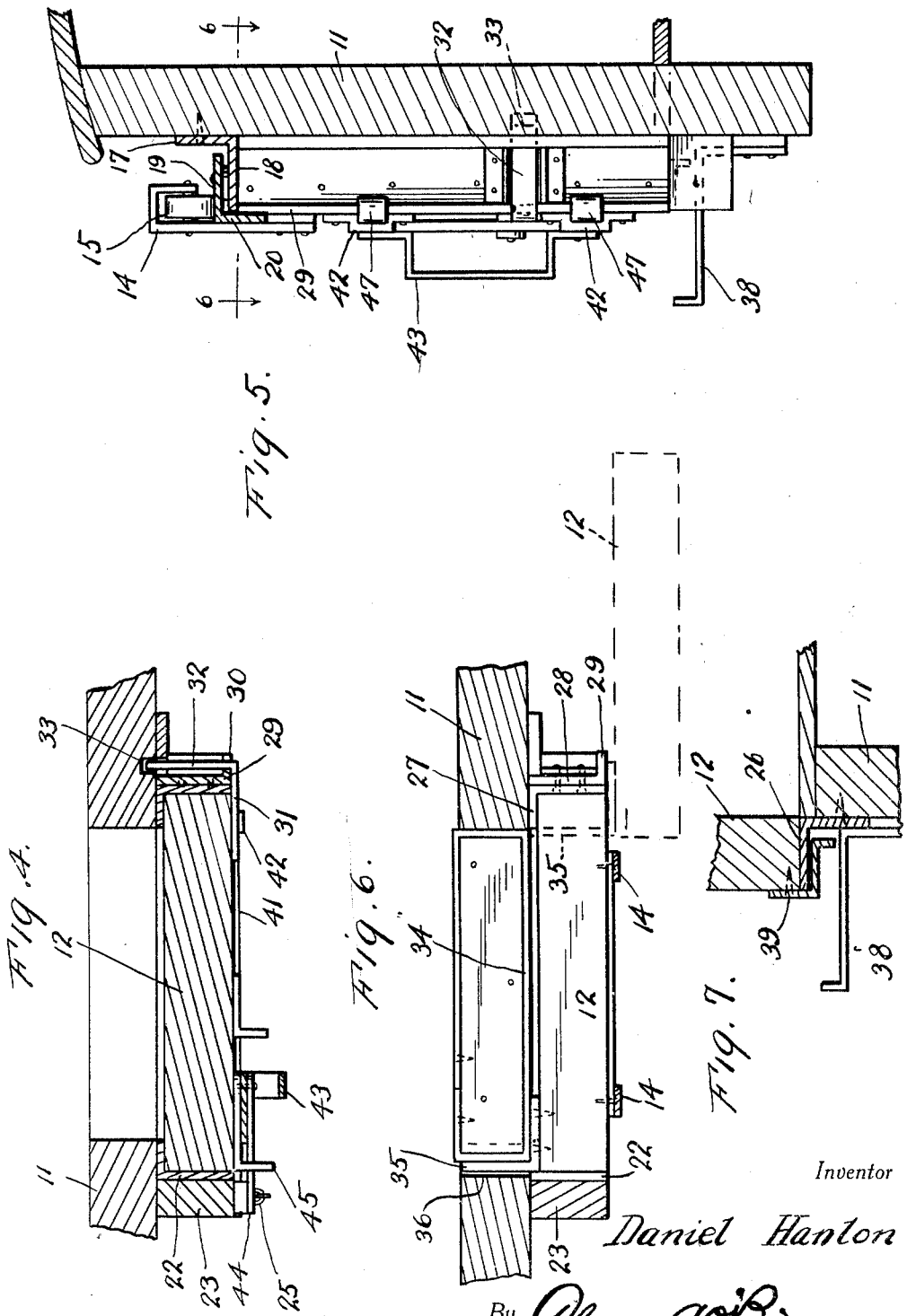

Patented Apr. 5, 1932

1,852,410

UNITED STATES PATENT OFFICE

DANIEL HANLON, OF MILFORD, NEW BRUNSWICK, CANADA

CAR DOOR

Application filed November 19, 1929, Serial No. 408,301, and in Canada July 26, 1929.

This invention relates to an improved door construction which is susceptible of practical usage in diversified forms of constructional work and which is expressly, but not necessarily, designed as a car door, particularly for grain and refrigerating cars.

It is a matter of common knowledge that the ordinary car door is of a slidable type, the same including sheave equipped hangers suspended from a stationary track on the body or walls of the car. Doors of this character become jammed, distorted, and cumbersome to handle. Frequently, it becomes necessary to employ forcible methods necessitating the use of crowbars and analogous implements in literally prying the door open. Even after the door is thus loosened with such implements, it is difficult to slide it to an open position because of its weight and refusal to pull readily.

With the foregoing difficulties in mind, I have evolved and produced a novel construction wherein the door is associated with unique mounting means to permit it to have a double action; namely, a bodily push-pull movement in a direction at right angles from the body of the car, and a subsequent horizontal movement parallel to the body of the car.

In perfecting this duplex arrangement, I have found it expedient to also incorporate in the structure a casing surrounding the door opening and providing a housing for reception of the door, insuring a snug fit such as adapts the structure to render it substantially dust-proof, almost air-proof and otherwise practical in fulfilling the requirements of a structure of this class.

It follows that one of the objects is to provide a car door which may be conveniently operated, and which when in closed position prevents the leakage of grain from the car and also to provide an auxiliary door wherein the assembly is such as to render the complete structure substantially waterproof, dust-proof, and to thereby maintain the contents of the car in excellent condition during transit.

A further object is to provide a door which may be used on refrigerator cars, or cars of the like nature wherein it is essential to have a close fit and to exclude as much air as is possible.

A further object is to provide a car door which is practically immune to jamming and dislocation, and which will not jar out of closed position even in the most adverse running conditions.

The specific structural details and their relative arrangement and coordination will become more readily apparent from the following description and drawings.

In the drawings:

Figure 1 is a fragmentary side elevational view of a portion of a car body equipped with a door constructed in accordance with the present invention, the door being shown fitted in the casing in its closed position.

Figure 2 is a view similar to Figure 1, showing the door slid to open position to uncover the car door opening.

Figures 3 and 4 are horizontal sectional views taken approximately on the plane of the line 3—3 and 4—4 respectively of Figure 1.

Figure 5 is a vertical sectional view on the line 5—5 of Figure 1.

Figure 6 is a horizontal section on the line 6—6 of Figure 5.

Figure 7 is a fragmentary detail section on the line 7—7 of Figure 1.

Figure 8 is a section taken approximately on the plane of the line 8—8 of Figure 2 showing the double track structure.

Figure 9 is a fragmentary perspective view of the slidable locking frame.

Figure 10 is a perspective view of an auxiliary latch.

Referring now to the drawings by reference numerals it will be observed in Figures 1 and 2 that the reference character 11 designates the side wall of the car body which is formed with a conventional door opening with which the door 12 is cooperable. The door is of usual rectangular configuration and disposed in a plane projecting beyond the external surface of the wall 11. It is provided with an auxiliary grain door 13 of suitable construction. This is to facilitate loading.

Attached to the upper portion of the door 12 are hangers 14 provided with supporting rollers or sheaves 15. The double track structure is generally designated by the reference character 16 and comprises two parts. For instance, there is a stationary part in the nature of an angle iron whose vertical flange 17 is rigidly fastened to the wall 11 and whose horizontal flange 18 cooperates with the companion flange 19 of the relatively movable track member. The latter member is also in the nature of an angle iron and has its depending flange 20 projecting below the flange 18 as seen in Figure 5. The horizontal flanges 18 and 19 are connected together through the medium of links 21 as seen in Figure 8.

Under normal conditions when the door is in closed position the flanges 18 and 19 are in overlapping relationship with the links in a folded state and interposed between said flange as shown in Figure 5. The links however may be expanded to the position seen in Figure 8, at which time the relatively movable track member swings outwardly in a limited arc to substantial spaced parallelism with the stationary track member. Also as shown in Figure 5, the rollers or sheaves rest on the horizontal flange 19 of the relatively movable section of the track.

In this way the door and its appurtenances may be bodily moved in two directions in quick succession. For instance the door may be pulled outwardly in substantial right angles from the body of the car and then shifted and slid in a horizontal plane in spaced parallelism to the car. This duplex action of the door is essentially important in that it permits the door to move outwardly sufficiently far to clear sliding contact with the body of the car and to avoid friction and jamming. This freedom of motion of the door is highly important as persons skilled in the art will appreciate.

It is understood of course, that the door moves in unison with the movable section of the track as it is pulled outwardly, whereupon the movable section remains relatively immovable for the time being while the door is slid on the rollers toward the right.

To provide for the effective dust-proof closure I provide a casing into which the door fits telescopically as seen in Figure 4. As shown in Figure 2, reference numerals 22 designate one of the casing members alongside of which is a vertical strut 23 carrying keepers 24 and a retention staple 25. The member 22 is preferably in the nature of an angle iron. There is another angle iron 26 at the bottom and still another vertical angle iron 27 (see Figure 6) at the right hand side of the door opening thus permitting the door to fit snugly in the casing. The angle iron 27 carries an L-plate 28 whose flange 29 functions as a keeper, and this flange is notched intermediate its ends as at 30 in Figure 1. In this connection, I call attention to an L-shaped bracket 31 fastened on the door and including a retaining finger 32 as seen in Figure 5, the extremity of which is adapted to drop into a socket 33 when the door is in closed position.

Also as shown in Figure 6, the reference numeral 34 designates a wear strip disposed in a plane even with the exterior surface of the body. A right-angled bracket 35 is fastened to the inner side of the door and the inwardly projecting portion thereof is receivable in a retaining hole 36 when the door is in closed position. This bracket, together with the aforesaid bracket 31 insures perfect retention of the door. The bracket 35 has an additional function however in that it constitutes a guide, a brake shoe when it slides along the strip 34 and also functions as a stop in engaging the angle iron 27 to limit the right-hand sliding distance of the door as the door is lifted out of the casing and moves over to open position. This brake shoe action limits the lateral movement of the door and prevents wabbling.

Then too, when in the position seen in Figure 6, it functions in easily seating the door in its casing. The reference characters 37 in Figure 1 function as stops to limit the outward movement of the movable sections of the aforesaid duplex track structure. Then as shown in Figure 7, the reference characters 38 designate similar stops limiting the outward pull of the door as it is drawn out of its casing. I might mention here also that the reference numeral 39 designates a suitably shaped shield which is fastened to the bottom of the door to cooperate with the bottom member of the casing in effecting a tight closure.

On its outer side the door is provided with a slidable locking clamp which embodies upper and lower straps 40 and 41 slidable through guides 42. These carry a suitably shaped operating handle 43. The left hand ends are adapted for reception in the aforesaid keepers 24 as shown in Figure 1 to hold the door in locked position. Incidently I mention that the reference character 44 denotes a tongue which cooperates with the aforesaid staple 25 and functions as a latch for holding the door. If desired, a padlock may be used here as seen in Figure 1.

The reference character 45 designates an auxiliary latch engageable with the retaining pin 46 as seen in Figure 2 for holding the sliding frame in an unlocked state as shown in Figure 2. The right hand end portion of the middle straps 40 and 41 are formed with hooks 47 which are releasably engageable with the aforementioned keeper flange 29 as shown for instance in Figure 3.

Under normal conditions when the door is in closed position, it fits snugly and telescopically in the outwardly projecting casing defined by the angle irons 22, 26 and 27 (see Figures 3, 4, 6 and 7). Assuming that the door is to be retained closed, it is obvious that the sliding locking frame assumes the state represented in Figure 1, at which time the left hand end portion of the metal strap 40 and 41 are engageable with the keepers 24. At this time the hooked ends 47 engage over the flange 29 as represented in Figure 3.

Then too, the horizontal flanges 18 and 19 of the sections of the track are in the overlapped relationship represented in Figure 5. By unlatching the latch 44 and sliding the locking frame toward the right so that it occupies the position shown in Figure 2, the frame will be rendered temporarily ineffective. To hold the frame in this position, supplemental latch 45 is engaged with the retaining pin 46 as represented in Figure 2.

Now the operator grasps the handle 43 and exerts an outward pull on the door in a direction at right angles to the wall or body of the car. The door is thus lifted out of the casing during which time it is suspended on the relatively movable track section as the latter moves from the position shown in Figure 5 to the expanded position shown in Figure 8. The stop limits the outward pulling motion of the door and it is now ready to be slid open at which time the track sections remain stationary while the rollers ride on the horizontal flange 19 as is obvious, permitting the door to be moved from the position seen in Figure 1 to the position seen in Figure 2. As before mentioned, during this movement, the finger of the bracket 35 is lifted out of the hole 36 as seen in Figure 6 and rides along the wear strip 34 which then functions as a runner until it assumes the dotted line position shown in this same figure, at which time it abuts the angle iron 27 limiting the right hand movement of the door. The return motion and replacement of the door in the casing is of course obvious.

A careful consideration of the description in connection wth the drawings will enable the reader to obtain a clear understanding of the construction, arrangement of parts, and the features and advantages. Therefore, a more lengthy description is regarded unnecessary.

Minor changes in shape, size and rearrangement of elements coming within the field of invention claimed may be resorted to in actual practice if desired.

I claim:

1. In a structure of the class described, in combination, a car body including a car door opening, a car door movable over said opening, a horizontally disposed angle iron fixedly mounted on the car body above said opening and constituting a stationary track support, a second angle iron disposed in parallelism with said first-named angle iron and constituting a relatively movable track, links pivotally connecting said track with the support and permitting said track to move laterally toward and from the car body in a horizontal plane with respect to said car body so as to be withdrawn and engage the door with the opening in a plane parallel thereto, the car door having its upper edge disposed beneath the depending flange of said movable track, locking, guiding, and retaining means for said car door, and hangers carried by the upper end portion of the car door cooperable with said movable track and provided with rollers suspended on and movable longitudinally along the horizontal flange of said movable track, said door being in all of its positions parallel with the wall of the car.

2. In a structure of the class described, in combination, a car wall including a car door opening, a door cooperable with said opening, a horizontally disposed fixedly mounted parallel relatively stationary track support, a horizontally disposed relatively movable track, links pivotally connecting said track and the track support in operative relation, and permitting the movable track to move toward and away from the car wall in a parallel plane with respect to said car wall, hangers carried by the upper portion of said car door and sheaves carried by said hangers having rollers riding on said movable track, said door being in all of its positions parallel with the wall of the car.

In testimony whereof I affix my signature.

DANIEL HANLON.